United States Patent [19]

Van Hijfte et al.

[11] Patent Number: 4,478,632

[45] Date of Patent: Oct. 23, 1984

[54] PROCESS FOR MAKING GRANULES CONTAINING UREA AS THE MAIN COMPONENT

[75] Inventors: Willy H. P. Van Hijfte, Assenede; Luc A. Vanmarcke, Kaprijke-Lembeke, both of Belgium

[73] Assignee: Compagnie Neerlandaise de l'Azote (Soci'ete' Anonyme), Belgium

[21] Appl. No.: 393,656

[22] Filed: Jun. 30, 1982

[30] Foreign Application Priority Data

Jul. 3, 1981 [NL] Netherlands ......................... 8103205

[51] Int. Cl.$^3$ ........................... C05G 3/00; C05C 9/00
[52] U.S. Cl. .......................................... 71/29; 71/30; 427/182; 427/213
[58] Field of Search ...................... 71/28–30, 71/64.06; 427/182, 213, 421; 564/63

[56] References Cited

U.S. PATENT DOCUMENTS 4,219,589  8/1980  Niks et al. ........................... 71/28 X

OTHER PUBLICATIONS

Derwent, Abstract 17560–Wolf, 12/10/80.

*Primary Examiner*—Ferris H. Lander
*Attorney, Agent, or Firm*—Scully, Scott, Murphy & Presser

[57] ABSTRACT

A process for making granules containing urea as the main component by spraying an aqueous urea solution having a urea concentration of 85–98% by weight, to which solution magnesium hydroxide, an inorganic magnesium salt or a mixture of such substances has been added as a crystallization retarder for the urea, and which solution optionally contains one or more other fertilizers in solution and/or suspension, is sprayed in the form of very fine droplets having an average diameter of between 20 and 120 micron into a fluidized bed of urea particles at a temperature at which the water on the solutions sprayed onto the particles is evaporated, and urea or urea containing material solidifies on the particles, to form granules having a desired size. The urea granules thus produced are compatible with single and triple superphosphate granules.

2 Claims, No Drawings

PROCESS FOR MAKING GRANULES CONTAINING UREA AS THE MAIN COMPONENT

Dutch patent application 7806213 discloses a process for making urea granules, which comprises spraying an aqueous urea solution having a urea concentration of 70–99.9% by weight, preferably 85–96% by weight, in the form of very fine droplets having an average diameter of 20–120 micron, into a fluidized bed of urea particles at a temperature at which the water from the solution sprayed onto the particles is evaporated, and urea solidifies on the particles to form granules having a desired size, which may be 25 mm and more. As that process is productive of rather great amount of dust, a crystallization retarder for the urea, in particular a water-soluble addition or condensation product of formaldehyde and urea, is added to the urea solution, whereby the formation of dust during the granulation is practically fully suppressed. The presence of the crystallization retarder has for its result that the granules remain plastic as they are being built, so that owing to rolling and/or impacts during granule formation, mechanically strong, smooth and round granules are formed. The granules thus produced have a high crushing strength, a high impact resistance, and little tendency of forming dust from rubbing together, and in addition do not cake, even when stored for long periods of time, although urea has a high natural caking tendency.

Fertilizer granules are known which in addition to urea contain one or more other fertilizers. Such granules can be produced by the granulation in a fluidized bed of an aqueous urea solution containing one or more other fertilizers in solution and/or suspension.

Examples of fertilizers which are often processed to granules together with urea are ammonium sulphate, ammonium dihydrogen phosphate and diammonium hydrogen phosphate. Urea and ammonium sulphate containing granules serve for fertilizing lands poor in sulphur, and often contain up to 40% by weight and preferably 15–20% by weight of ammonium sulphate. Granules containing urea and ammonium dihydrogen phosphate or diammonium hydrogen phosphate are often made to consumer's specification, who requires a certain percentage of phosphate in the granules. Other fertilizers are also sometimes processed with urea into granules.

It has now been found that certain magnesium compounds are good crystallization retarders for urea, and that granules produced by granulating a urea solution containing such a crystallization retarder, have unique properties, also if the urea solution contains one or more other fertilizers in suspension or solution.

The invention accordingly relates to a process for making granules containing urea as the main component by spraying an aqueous urea solution having a urea concentration of 85–98% by weight, to which solution a crystallization retarder for the urea has been added, and which solution optionally contains other fertilizers, such as ammonium sulphate, ammonium, dihydrogen phosphate, and diammonium hydrogen phosphate, in solution or suspension, in the form of very fine droplets having an average diameter of between 20–120 micron, into a fluidized bed of urea particles at a temperature at which the water from the solution or suspension sprayed onto the particles is evaporated, and urea or fertilizer material containing urea as the main component solidifies on the particles to form granules having a desired size, said process being characterized by using as said crystallization retarder magnesium hydroxide, an inorganic magnesium salt, or a mixture of such substances.

It has surprisingly been found that the presence of magnesium hydroxide and/or an inorganic magnesium salt during the granulation of a urea containing solution in a fluidized bed results in a well-proceeding granule building process, and prevents, or minimizes, the formation of dust, while in addition the resulting urea granules have a high crushing strength, a high apparent specific gravity, and in most cases a reduced caking tendency, in some cases do not even cake when stored for prolonged periods of time. A further very important feature is that the granules produced according to the invention are compatible with single and triple superphosphate granules (SSP and TSP, respectively), which make them suitable for bulk blending with these phosphate fertilizers.

Conventional urea granules are known to be unsuitable for use in heterogeneous binary and ternary fertilizer mixtures, such as N-P or N-P-K mixtures, by bulk blending with a cheap single or triple superphosphate, as such urea granules are incompatible with these phosphates. Mixtures of such urea granules with single or triple superphosphate granules deliquesce after some time, forming an unmanageable and unusable mud. According to a paper presented by G. Hoffmeister and G. H. Megar during "The Fertilizer Industry Round Table" at Washington D.C. on Nov. 6, 1975, this incompatibility is caused by a reaction according to the following equation

$$Ca(H_2PO_4)_2 \cdot H_2O + 4CO(NH_2)_2 \rightarrow Ca(H_2PO_4)_2 \cdot 4CO(NH_2)_2 + H_2O.$$

Owing to the reaction of 1 mole monocalcium phosphate monohydrate, the main component of SSP and TSP, with 4 moles or urea, a urea monocalcium phosphate adduct is formed, whereby 1 mole of water is liberated. As the adduct is very soluble, it is readily dissolved in the water released to form a large volume of solution, which moistens the granules in the mixture, owing to which the reaction proceeds ever faster. No commercially acceptable means are known for rendering urea compatible with SSP and PSP. Indeed, for bulk blending with urea the more expensive phosphate fertilizers, monoammonium phosphate and diammonium phosphate, have hitherto been used.

The urea granules produced according to the present invention, however, which contain urea as the main component, are compatible with SSP and TSP granules in all ratios, which makes them suitable for bulk blending with these phosphate fertilizers.

Examples of inorganic magnesium salts suitable for use in the process according to the invention are magnesium chloride, magnesium sulphate, magnesium nitrate, magnesium carbonate and basic magnesium carbonate. The magnesium hydroxide or the inorganic magnesium salt is added to the urea containing solution or suspension to be granulated in a quantity equivalent to at least 0.1% by weight of MgO, preferably to 0.4–1% by weight of MgO, calculated on the solid content of the solution or suspension. Proportions of more than 1.5% by weight, calculated as MgO, are not harmful, but do not offer any particular advantages. The additive may be added to the urea containing solution or suspension to be granulated in the form of a powder, or in the form or an aqueous solution or suspension.

Preferably, after their formation, the granules are cooled to 30° C. or to a lower temperature, for example, by means of an airstream, whose moisture content has preferably been reduced so that during cooling the granules do not absorb any moisture from the cool air.

The invention also relate to compatible, heterogeneous fertilizer mixtures of urea containing granules produced by the process according to the invention with single or triple superphosphate granules, and if desired, one or more other granular fertilizers.

In addition to urea containing granules and single or triple superphosphate granules, generally a potassium fertilizer is included in the mixture, such as KCl. In order to prevent segregation of the mixture, the particle sizes of the components to be blended should be adapted to each other.

The starting material used for the process according to the invention is an aqueous urea solution with a urea concentration of 85–98% by weight. For the granulation of urea together with one or more other fertilizers, preferably a urea solution with a urea concentration of 90–95% by weight is used, to which the other fertilizer is added in the solid state, preferably in finely-divided form, or as an aqueous solution or suspension. The solubility of the fertilizers to be added in the aqueous urea solution varies. Thus the solubility of ammonium sulphate in a 95% by weight urea solution is 12%, and in a 90% by weight urea solution 20%. Ammonium dihydrogen phosphate and diammonium hydrogen phosphate can form highly viscous solutions with 90–95% by weight urea solutions, which are difficult to be sprayed. This can be prevented by passing the urea solution and an aqueous solution of the phosphate separately to the sprayers and there mixing them together for a short period of time only before the mixture is sprayed.

The invention is illustrated in and by the following examples.

EXAMPLE I

The effect of the process according to the invention is demonstrated by the following tests, in which an aqueous urea solution without and with a known crystallization retarder and with magnesium hydroxide or an inorganic magnesium salt as a crystallization retarder was sprayed into a fluidized bed of urea particles. The granulation conditions and the physical properties of the resulting granules are listed in the following table.

The "TVA Bottle Test", referred to in the table, serves for determining the compatibility of urea granules with SSP and TSP granules. In this test, the condition of a mixture of the urea granules to be tested with SSP or TSP granules, kept in a closed bottle of 120 cm$^3$ at 27° C. was periodically inspected. So long as the mixture did not exhibit more than some moisture spots, it was qualified as suitable for use.

By means of the "bag test", referred to in the table, the caking tendency of the granules tested was determined. In this test, urea granules were packed in bags of 35 kg, which were stored at 27° C. under a weight of 1000 kg. After 1 month, the percentage by weight of lumps per bag was determined, and the average hardness of the lumps was measured. Hardness as used in this context means the force in kg, exerted by a dynamometer for disintegrating a lump of 7×7×5 cm.

The crystallization retarder F 80, mentioned in the table, is a clear viscous liquid commercially available under the name of "Formurea 80", which is stable between −20° C. and +40° C. and, upon analysis, is found to contain per 100 parts by weight approximately 20 parts of water, approximately 23 parts of urea and approximately 57 parts of formaldehyde, approximately 55% of the amount of formaldehyde being bound as trimethylolurea, and the balance being present in the non-combined condition.

TABLE A

| Test No. | 1 | 2 | 3 | 4 | 5 | 6 | 7 | 8 |
|---|---|---|---|---|---|---|---|---|
| Crystallisation retarder | none | F 80 1% | Mg(OH)$_2$ 1.2% | MgCl$_2$.6H$_2$O 2.5% | MgSO$_4$.7H$_2$O 2.5% | Mg(NO$_3$)$_2$.6H$_2$O 2.5% | MgCO$_3$ 1.5% | 4MgCO$_3$.Mg(OH)$_2$ 1.5% |
| Granulation conditions | | | | | | | | |
| urea solution | | | | | | | | |
| concentration, wt % | 94.6 | 94.5 | 94.5 | 95.5 | 95.5 | 95.5 | 95.5 | 95.5 |
| temperature, °C. | 130 | 130 | 130 | 130 | 130 | 130 | 130 | 130 |
| rate, kg/hour | 280 | 280 | 280 | 220 | 220 | 220 | 220 | 280 |
| injection air | | | | | | | | |
| rate, Nm$^3$/hour | 130 | 130 | 130 | 130 | 130 | 130 | 130 | 130 |
| temperature, °C. | 140 | 140 | 145 | 146 | 144 | 144 | 144 | 148 |
| fluidisation air | | | | | | | | |
| rate, Nm$^3$/hour | 850 | 850 | 850 | 850 | 850 | 850 | 850 | 850 |
| temperature, °C. | 45 | 64 | 73 | 67 | 70 | 67 | 67 | 63 |
| bed temperature, °C. | 108 | 105 | 99 | 94 | 102 | 99 | 105 | 105 |
| Product properties | | | | | | | | |
| apparent density, g/cm$^3$ | 1.23 | 1.26 | 1.29 | 1.28 | 1.27 | 1.29 | 1.29 | 1.29 |
| crushing strength dia. 2.5 mm, kg | 2.1 | 2.8 | 4.2 | 4.4 | 2.9 | 2.8 | 3.2 | 3.5 |
| dust, g/kg | 5.4 | <0.1 | <0.1 | <0.1 | <0.1 | 0.1 | <0.1 | <0.1 |
| bag test | | | | | | | | |
| lumps, % | 100 | 10 | 8 | 31 | 100 | 39 | 0 | 0 |
| hardness, kg | 22 | <1 | <1 | 2.3 | 22 | 3.9 | 0 | 0 |
| TVA Bottle Test with SSP 50/50 | | | | | | | | |
| suitability, days | <3 | <3 | 21 | >60 | >60 | >60 | >60 | >60 |
| with TSP 50/50 suitability, days | <3 | <3 | 14 | >14 | >60 | 14 | 14 | 14 |

EXAMPLE II

In a number of granulation tests, a suspension of finely-ground ammonium sulphate in a 95 wt % aqueous urea solution with a known crystallization retarder (F 80) and with a magnesium compound as a crystallization retarder was sprayed into a fluidized bed of urea particles. The ammonium sulphate content of the suspension was 20% by weight.

The suspension was sprayed at a temperature of 120°–130° C. and at a rate of approximately 300 kg/hour. Spraying was effected by means of spraying air having a temperature of 140° C. under an overpressure of 0.35 kg/cm$^2$ and supplied at a rate of approximately 140 Nm$^3$/hour. The bed was fluidized with air supplied at a rate of 650–850 Nm$^3$/hour. The temperature of the fluidization air was controlled so that the temperature of the bed was maintained between 105° and 108° C.

In all tests, granule build-up in the fluidized bed proceeded excellently. The product contained only very little fine material, which means that the sprayed suspension was used practically entirely for the build-up of the granules. The chemical and physical properties of the resulting granules are listed in the following table.

TABLE B

| Crystallization retarder | 1% F 80 | | | Mg(OH)$_2$ 1.2% | Mg(NO$_3$)$_2$.2.6H$_2$O 2.5% |
|---|---|---|---|---|---|
| Chemical properties: | | | | | |
| moisture, wt % | 0.18 | 0.13 | 0.21 | 0.18 | 0.14 |
| ammonium sulphate, wt % | 13.7 | 15.0 | 18.5 | 19.5 | 18.6 |
| pH of 10 wt % solution | 5.2 | 5.0 | 5.1 | 8.2 | 5.0 |
| Physical properties: | | | | | |
| crushing strength dia. 2.5 mm, kg | 3.3 | 3.4 | 3.5 | 3.9 | 4.0 |
| bag test | | | | | |
| lumps, % | 48 | 25 | 35 | 0 | 0 |
| hardness, kg | 2.2 | 2.5 | 4.0 | 0 | 0 |
| TVA Bottle Test with SSP 50/50 | | | | | |
| suitability for use, days with TSP 50/50 | <3 | <3 | <3 | >60 | >60 |
| suitability for use, days | <3 | <3 | <3 | >60 | >60 |

We claim:

1. In a process for making granules containing urea as the main component by spraying as aqueous urea solution having a urea concentration of 85–98% by weight, to which solution is added a crystallization retarder for the urea, said solution optionally other fertilizers including ammonium sulphate, ammonium dihydrogen phosphate, and diammonium hydrogen phosphate, in solution or suspension, in the form of fine droplets having an average diameter between 20 and 120 microns, into a fluidized bed of urea particles at a temperature at which the water from the solution or suspension sprayed onto the particles is evaporated and the urea or fertilizer material containing urea as the main component solidifies on the particles to form granules having a desired size, the improvement comprising using as the crystallization retarder a member selected from the group consisting of magnesium hydroxide, an inorganic magnesium salt or a mixture thereof, wherein said magnesium hydroxide, inorganic salt or mixture thereof is added to the solution or suspension in an amount equivalent to at least 0.1 to about 1.0% by weight of MgO calculated on the urea in said solution or suspension.

2. Compatible heterogeneous fertilizer mixtures of urea containing granules produced by the process according to claim 1, further comprising single or triple superphosphate granules, and optionally other granular fertilizers including KCl.

* * * * *